United States Patent
Talbird et al.

(10) Patent No.: US 10,672,088 B2
(45) Date of Patent: Jun. 2, 2020

(54) AUTOMATED VALUATION MODEL WITH COMPARATIVE VALUE HISTORY INFORMATION

(75) Inventors: David A. Talbird, Bronx, NY (US); Megan C. Berry, Rockville, MD (US); Felix G. Meale, North Bethesda, MD (US); Eric Rosenblatt, Derwood, MD (US); Jesse Staal, Arlington, VA (US)

(73) Assignee: Fannie Mae, Washington, DC (US)

( * ) Notice: Subject to any disclaimer, the term of this patent is extended or adjusted under 35 U.S.C. 154(b) by 284 days.

(21) Appl. No.: 13/527,353

(22) Filed: Jun. 19, 2012

(65) Prior Publication Data
US 2013/0339255 A1 Dec. 19, 2013

(51) Int. Cl.
G06Q 50/16 (2012.01)
G06Q 30/02 (2012.01)

(52) U.S. Cl.
CPC ........... *G06Q 50/16* (2013.01); *G06Q 30/02* (2013.01); *G06Q 30/0283* (2013.01)

(58) Field of Classification Search
CPC .................................................. G06G 17/30
USPC ..................................... 705/7, 723; 707/723
See application file for complete search history.

(56) References Cited

U.S. PATENT DOCUMENTS

| | | | |
|---|---|---|---|
| 5,361,201 A * | 11/1994 | Jost et al. | 705/35 |
| 5,966,700 A | 10/1999 | Gould et al. | |
| 7,099,843 B1 | 8/2006 | Cassidy et al. | |
| 7,289,965 B1 | 10/2007 | Bradley et al. | |
| 7,340,431 B1 | 3/2008 | McManus et al. | |
| 7,451,095 B1 | 11/2008 | Bradley et al. | |
| 7,509,261 B1 | 3/2009 | McManus et al. | |
| 7,593,890 B1 | 9/2009 | Bradley et al. | |
| 7,647,272 B1 | 1/2010 | Muren | |
| 7,693,764 B1 | 4/2010 | Gordon et al. | |
| 7,711,574 B1 | 5/2010 | Bradley et al. | |
| 7,792,742 B1 | 9/2010 | Thomas et al. | |
| 7,797,166 B1 | 9/2010 | Bradley et al. | |

(Continued)

OTHER PUBLICATIONS

Kaklauskas, Conceptual Modelling of Construction and Real Estate Crisis With Emphasis on Comparative Qualitative Aspects Description, vol. 9, No. 1(19), 2010, Transformations in Business & Economics, 51-52 (Year: 2010).*

(Continued)

*Primary Examiner* — Patricia H Munson
*Assistant Examiner* — V K Puri
(74) *Attorney, Agent, or Firm* — Michael Best & Friedrich LLP

(57) ABSTRACT

An automated valuation model and corresponding analysis tool that graphically displays value history information in association with a subject property is disclosed. In one example, the tool generates a graph plotting the valuation history of a subject property over an adjustable time range in relation to a general price index for a pertinent geographical area. When looking at an appraisal for a property, the graph also supports selective plotting of appraiser-selected comparable properties' valuation histories against that of the subject property. The valuation history for comparable properties can be scaled on a pro-rata basis according to the percentage of the adjustments made within the appraisal. In addition, the graph selectively incorporates model-generated comparables and their valuation histories.

16 Claims, 9 Drawing Sheets

(56) References Cited

U.S. PATENT DOCUMENTS

| | | | |
|---|---|---|---|
| 7,835,919 B1 | 11/2010 | Bradley et al. | |
| 7,882,025 B1 | 2/2011 | Seal et al. | |
| 7,904,381 B1 | 3/2011 | Tatang et al. | |
| 7,941,365 B1 | 5/2011 | Bradley et al. | |
| 7,941,366 B1 | 5/2011 | Bradley et al. | |
| 7,945,510 B1 | 5/2011 | Bradley et al. | |
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 | 10/2011 | Stinson | |
| 8,108,302 B1 | 1/2012 | Bradley et al. | |
| 8,140,421 B1 | 3/2012 | Humphries et al. | |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 8,650,067 B1* | 2/2014 | Moss | G06Q 30/0201 705/306 |
| 2001/0039506 A1* | 11/2001 | Robbins | G06Q 10/06 705/7.34 |
| 2002/0087389 A1* | 7/2002 | Sklarz | G06Q 30/02 705/7.34 |
| 2005/0154656 A1 | 7/2005 | Kim et al. | |
| 2005/0154657 A1* | 7/2005 | Kim | G06Q 40/12 705/30 |
| 2006/0122918 A1* | 6/2006 | Graboske | G06Q 10/10 705/30 |
| 2006/0200384 A1* | 9/2006 | Arutunian | G06Q 30/02 705/14.69 |
| 2007/0033122 A1* | 2/2007 | Cagan | G06Q 40/00 705/35 |
| 2007/0198278 A1* | 8/2007 | Cheng | G06Q 10/10 705/306 |
| 2008/0004893 A1 | 1/2008 | Graboske | |
| 2009/0099948 A1* | 4/2009 | Geltner | G06Q 30/02 705/35 |
| 2010/0036750 A1* | 2/2010 | Whelan | G06Q 30/06 705/26.1 |
| 2010/0049539 A1* | 2/2010 | Wiese | G06Q 30/0278 705/306 |
| 2010/0057538 A1* | 3/2010 | Hardman | G06Q 40/06 705/313 |
| 2010/0161498 A1* | 6/2010 | Walker | G06Q 30/02 705/306 |
| 2011/0313945 A1* | 12/2011 | Callan | G06Q 40/00 705/36 R |
| 2012/0330715 A1* | 12/2012 | Malaviya | G06Q 30/02 705/7.29 |
| 2012/0330719 A1* | 12/2012 | Malaviya | G06Q 30/02 705/7.31 |
| 2013/0282596 A1* | 10/2013 | Fleming | G06Q 50/16 705/306 |

OTHER PUBLICATIONS

Pace, A method for spatial-temporal forecasting with an application to real estate prices, nternational Journal of Forecasting, 2000, 238-239 (Year: 2000).*

Vandell, Kerry D. "Optimal Comparable Selection and Weighting in Real Property Valuation" AREUEA Journal, vol. 19, No. 2, 1991, pp. 213-239.

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

FIG. 5B

| Show | Series Name | Act. Price | Adj Price |
|---|---|---|---|
| ☑ S | Subject | | $629K |
| ☑ | Subject HPI | | |
| ☑ | 5005 E HILLSIDE AVE | $650K | $624K |
| ☐ | 1715 N WILLIAMSBURG ST | $680K | $633K |
| ☐ | 5827 E MOUNTAIN AVE | $719K | $703K |
| ☐ | 1902 N ZION ST | $590K | $610K |
| ☐ | 5007 E BROOKSIDE AVE | $450K | $514K |
| ☐ | 5747 E SAN JUAN DR | $530K | $572K |
| ☐ | 4923 E LAKESIDE AVE | $565K | $630K |
| ☐ | 6962 E MAGDALENA DR | $800K | $773K |
| ☐ AS | 10131 PHELAN DR | $975K | $938K |
| ☐ AS | 17801 BISHOP CIR | $800K | $796K |
| ☐ AS | 10882 VIDA DR | $740K | $755K |
| ☐ | 10041 SUNKIST CIR | $1049K | $1190K |

FIG. 5C

AUTOMATED VALUATION MODEL WITH COMPARATIVE VALUE HISTORY INFORMATION

BACKGROUND OF THE INVENTION

1. Field of the Invention

This application relates to an automated valuation model that accommodates assessment of subject items with graphical assessment of value history.

2. Description of the Related Art

Automated valuation models (AVMs) are now widely used to automatically evaluate properties, such as for assessing the propriety of including comparable properties in an appraisal, determining whether an appraisal value is appropriate, and so forth.

AVMs have progressed to the point of generating rich data corresponding to property valuation as well as the underlying property characteristics. This data is useful for assessing the propriety of comparables, or reviewing a property valuation. However, this data is typically presented for the current time, which does not allow an appreciation and review of the history of the valuation of a subject and/or comparables.

What is needed is an AVM tool that generates value history information to accommodate a better assessment of a subject property and/or comparable properties.

SUMMARY OF THE INVENTION

The present invention provides an automated valuation model and corresponding analysis tool that graphically displays value history information in association with a subject property. In one example, the tool generates a graph plotting the valuation history of a subject property over an adjustable time range in relation to a general price index for a pertinent geographical area.

When looking at an appraisal for a property, the graph also supports selective plotting of appraiser-selected comparable properties' valuation histories against that of the subject property. The valuation history for comparable properties can be scaled on a pro-rata basis according to the percentage of the adjustments made within the appraisal.

In addition, the graph selectively incorporates model-generated comparables and their valuation histories.

In one embodiment, a dynamic chart is used to plot the valuation history of a subject property. Preferably, transaction information such as a refinance, sale, or REO transaction is used to plot the valuation history. Additionally, a historical HPI for the subject property's geographic region (e.g., Postal Code or MSA) is also plotted according to user preference. The graph may also be used to plot a set of similar properties as determined by an automated valuation model (AVM). In situations where an appraisal report is under review, the comparable properties identified by the appraiser can be concurrently plotted on the graph.

A user interface is provided to receive information to tailor the graph, such as identification of the subject property, identification of an appraisal report and/or its appraiser-chosen comparables, date range preferences, and other information. The time window for the plotting mechanism can be expanded and contracted according to the preference of the user. A grid may also be concurrently displayed with the graph, and is configured to as a key to the graph. For example, the grid may be configured to display the name of each historical valuation, an actual price for all properties, and an adjusted price for all model and appraiser selected comparables. Color coding and a variety of symbols may be used to identify valuation histories and corresponding valuation transactions.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 5A-D are display diagrams illustrating examples of displays generated by the comparable property analysis application.

DETAILED DESCRIPTION OF THE INVENTION

Figure 1A:
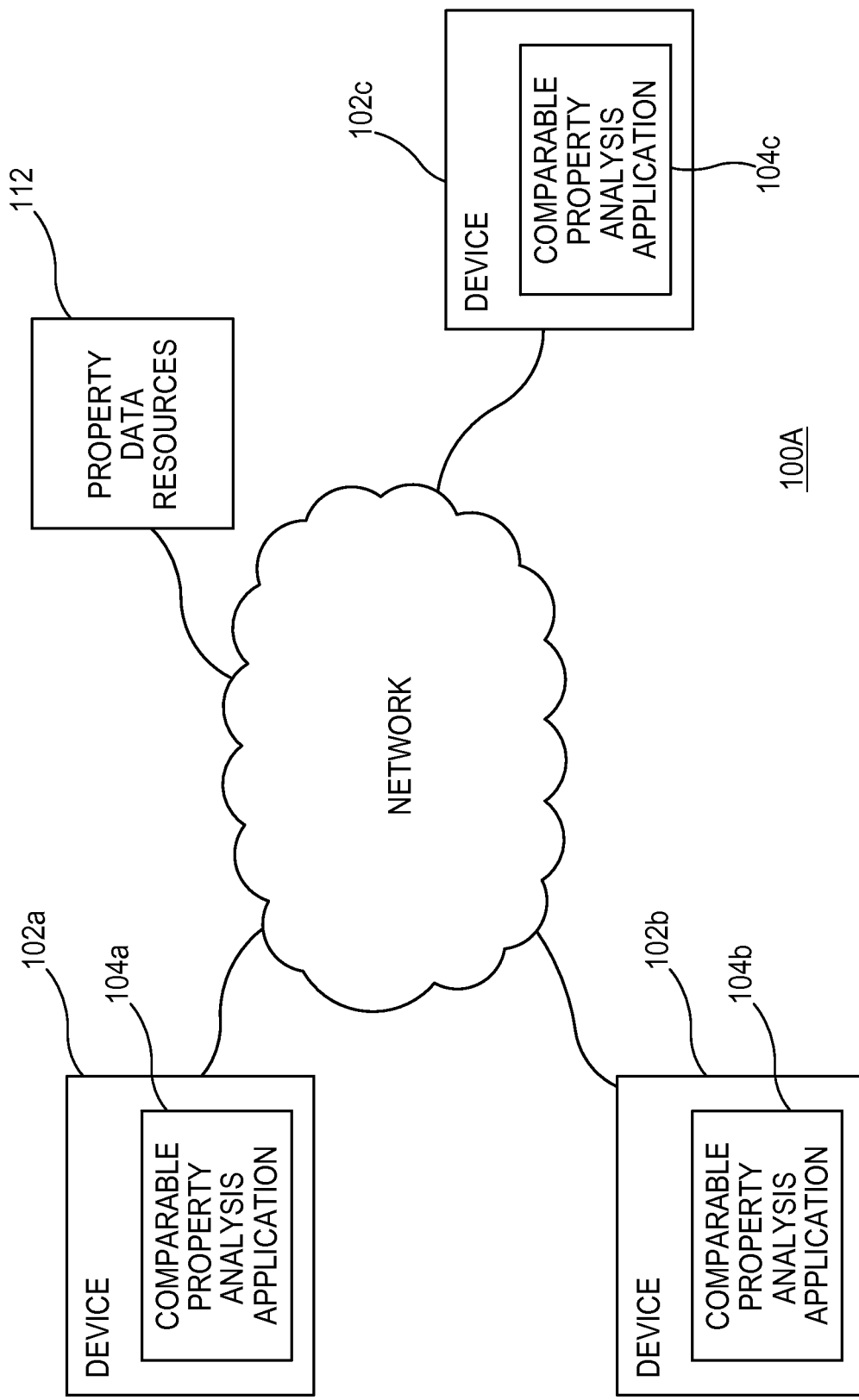
FIGS. 1A-B are block diagrams illustrating examples of systems with a comparable property analysis application that uses property characteristics variables that include categorical condition and quality variables.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present invention provides an automated valuation model and corresponding analysis tool that graphically displays value history information in association with a subject property. In one example, the tool generates a graph plotting the valuation history of a subject property over an adjustable time range in relation to a general price index for a pertinent geographical area. When looking at an appraisal for a property, the graph also supports selective plotting of appraiser-selected comparable properties' valuation histories against that of the subject property.

The valuation history for comparable properties can be scaled on a pro-rata basis according to the percentage of the adjustments made within the appraisal. Thus, if there is an adjustment to a comparable property (either from the model or by an appraiser) then the values in the graph of that property can be adjusted by that percentage amount. For example: Comp 1 has a sale price of $500,000, but the adjusted price according to the appraiser adjustments is $450,000. This comparable has historical sales of $400,000, $300,000, and $200,000. The user can choose to view the transactions on an adjusted basis. Therefore, observations change as follows: $500,000->$450,000, $400,000->$360,000, $300,000->$270,000, $200,000->$180,000. The line is thus scaled based on the 10% adjustment.

In addition, the graph selectively incorporates model-generated comparables and their valuation histories.

In one embodiment, a dynamic chart is used to plot the valuation history of a subject property. Preferably, transaction information such as a refinance, sale, or REO transaction is used to plot the valuation history. Additionally, a historical HPI for the subject property's geographic region (e.g., Postal Code or MSA) is also plotted according to user preference. The graph may also be used to plot a set of similar properties as determined by an automated valuation model (AVM). In situations where an appraisal report is under review, the comparable properties identified by the appraiser can be concurrently plotted on the graph.

A user interface is provided to receive information to tailor the graph, such as identification of the subject property, identification of an appraisal report and/or its appraiser-chosen comparables, date range preferences, and other information. The time window for the plotting mechanism can be expanded and contracted according to the preference of the user. A grid may also be concurrently displayed with the graph, and is configured to as a key to the graph. For example, the grid may be configured to display the name of each historical valuation, an actual price for all properties, and an adjusted price for all model and appraiser selected comparables. Color coding and a variety of symbols may be used to identify valuation histories and corresponding valuation transactions.

The value history is preferably presented in conjunction with an AVM that performs a regression based upon property characteristics, along with exclusions and adjustments, followed by weighting, ranking and displaying of the properties.

The AVM may be run independently so as to assess any set of possible comparable properties for any given subject property. Alternatively, the AVM may be run to assess an appraisal report by showing how well the comps in the appraisal report match the subject property relative to those predicted as good comparables by the model.

In connection with the display of the ranked listing, as well as the valuation history in a graph, a map image may be displayed to illustrate the geographic distribution of the subject property and the comparable properties.

An associated property data grid further details information about the subject and comparable properties. The grid can be sorted according to a variety of property and other characteristics, and operates in conjunction with the map image, and is keyed to the value history graph, to ease review of the comparables and corresponding criteria.

(i) Hedonic Equation

The regression may be a hedonic regression that correlates a dependent variable to a number of property characteristic explanatory variables.

In an example hedonic equation, the dependent variable is sale price and the explanatory variables can include the physical characteristics, such as gross living area, lot size, age, number of bedrooms and or bathrooms, as well as location specific effects, time of sale specific effects, property condition effect (or a proxy thereof). The ordinarily skilled artisan will readily recognize that various different variables may be used in conjunction with the present invention.

In this example, the dependent variable is the logged sale price. The explanatory variables are:

(1) Four continuous property characteristics:
  (a) log of gross living area (GLA),
  (b) log of Lot Size,
  (c) log of Age, and
  (d) Number of Bathrooms; and
(2) Five fixed effect variables:
  (a) location fixed effect (e.g., by Census Block Group (CBG));
  (b) Time fixed effect (e.g., measured by 3-month periods (quarters) counting back from the estimation date);
  (c) Foreclosure status fixed effect, which captures the maintenance condition and possible REO discount;
  (d) Condition Category (e.g., the property is one of m different condition categories, $CC_1$ through $CC_m$); and
  (e) Quality Category (e.g., the property is one of s different quality categories, $QC_1$ through $QC_s$).

The exemplary equation (Eq. 1) is as follows:

$$\ln(p) = \beta_{gla} \cdot \ln(GLA) + \beta_{lot} \cdot \ln(LOT) + \qquad \text{(Eq. 1)}$$
$$\beta_{age} \cdot \ln(AGE) + \beta_{bath} \cdot BATH + + \sum_{i=1}^{N_{CBG}} LOC_i^{CBG} +$$
$$\sum_{j=1}^{N_{QTR}} TIME_j + \sum_{k=\{0,1\}} FCL_k + \sum_{l=\{1-m\}} CC_l + \sum_{r=\{1-s\}} QC_r + \varepsilon.$$

Although any categorization may be used for the Condition Category and Quality Category Variables, in one example they may be those implemented in a Uniform Appraisal Dataset (UAD) as implemented in the real estate industry.

Particularly, in this example the variables are described as follows. For the Condition Category variable:

$CC_1$: The improvements have been very recently constructed and have not previously been occupied. The entire structure and all components are new and the dwelling features no physical depreciation.

$CC_2$: The improvements feature no deferred maintenance, little or no physical depreciation, and require no repairs. Virtually all building components are new or have been recently repaired, refinished, or rehabilitated. All outdated components and finishes have been updated and/or replaced with components that meet current standards. Dwellings in this category either are almost new or have been recently completely renovated and are similar in condition to new construction.

$CC_3$: The improvements are well maintained and feature limited physical depreciation due to normal wear and tear. Some components, but not every major building component, may be updated or recently rehabilitated. The structure has been well maintained.

$CC_4$: The improvements feature some minor deferred maintenance and physical deterioration due to normal wear and tear. The dwelling has been adequately maintained and requires only minimal repairs to building components/mechanical systems and cosmetic repairs. All major building components have been adequately maintained and are functionally adequate.

$CC_5$: The improvements feature obvious deferred maintenance and are in need of some significant repairs. Some building components need repairs, rehabilitation, or updating. The functional utility and overall livability is somewhat diminished due to condition, but the dwelling remains useable and functional as a residence.

$CC_6$: The improvements have substantial damage or deferred maintenance with deficiencies or defects that are severe enough to affect the safety, soundness, or structural integrity of the improvements. The improvements are in need of substantial repairs and rehabilitation, including many or most major components.

For the Quality Category variable:

$QC_1$: Dwellings with this quality rating are usually unique structures that are individually designed by an architect for a specified user. Such residences typically are constructed from detailed architectural plans and specifications and feature an exceptionally high level of workmanship and exceptionally high-grade materials throughout the interior and exterior of the structure. The design features exceptionally high-quality exterior refinements and ornamentation, and exceptionally high-quality interior refinements. The workmanship, materials, and finishes throughout the dwelling are of exceptionally high quality.

$QC_2$: Dwellings with this quality rating are often custom designed for construction on an individual property owner's site. However, dwellings in this quality grade are also found in high-quality tract developments featuring residences constructed from individual plans or from highly modified or upgraded plans. The design features detailed, high quality exterior ornamentation, high-quality interior refinements, and detail. The workmanship, materials, and finishes throughout the dwelling are generally of high or very high quality.

$QC_3$: Dwellings with this quality rating are residences of higher quality built from individual or readily available designer plans in above-standard residential tract developments or on an individual property owner's site. The design includes significant exterior ornamentation and interiors that are well finished. The workmanship exceeds acceptable standards and many materials and finishes throughout the dwelling have been upgraded from "stock" standards.

$QC_4$: Dwellings with this quality rating meet or exceed the requirements of applicable building codes. Standard or modified standard building plans are utilized and the design includes adequate fenestration and some exterior ornamentation and interior refinements. Materials, workmanship, finish, and equipment are of stock or builder grade and may feature some upgrades.

$QC_5$: Dwellings with this quality rating feature economy of construction and basic functionality as main considerations. Such dwellings feature a plain design using readily available or basic floor plans featuring minimal fenestration and basic finishes with minimal exterior ornamentation and limited interior detail. These dwellings meet minimum building codes and are constructed with inexpensive, stock materials with limited refinements and upgrades.

$QC_6$: Dwellings with this quality rating are of basic quality and lower cost; some may not be suitable for year-round occupancy. Such dwellings are often built with simple plans or without plans, often utilizing the lowest quality building materials. Such dwellings are often built or expanded by persons who are professionally unskilled or possess only minimal construction skills. Electrical, plumbing, and other mechanical systems and equipment may be minimal or non-existent. Older dwellings may feature one or more substandard or non-conforming additions to the original structure.

The variables and corresponding hedonic equation (Eq. 1) are provided as one preferred example. There may be various alternatives. Although CBG is used as the location fixed effect, other examples may include Census Tract or other units of geographical area. Additionally, months may be used in lieu of quarters, or other periods may be used regarding the time fixed effect.

Additionally, although the county may be used for the relatively large geographic area for which the regression analysis is performed, other areas such as a multi-county area, state, metropolitan statistical area, or others may be used. Still further, some hedonic models may omit or add different explanatory variables. For example, additional explanatory variables may relate to whether properties border geographical features having special value connotations such as bodies of water, or are close to geographical features such as schools, hospitals, bodies of water, etc.

(ii) Exclusion Rules

Comparable selection rules may also be used to narrow the pool of comps to exclude the properties which are determined to be insufficiently similar to the subject for reasons separate from the contributions as determined from the above-described regressions. The exclusion rules should be considered optional and will depend upon the implementation.

A comparable property should be located in a relative vicinity of the subject and should be sold relatively recently; it should also be of similar size and age and sit on a commensurate parcel of land. The "N" comparables that pass through the exclusion rules are used for further analysis and value prediction.

For example, the following rules may be used to exclude comparables pursuant to narrowing the pool:

(1) Property Condition: If the condition category differs from the comp condition by a threshold number then the comp is eliminated from the comp pool. In one embodiment, differing by 2 or more categories in the index results in elimination from the comp pool. In another embodiment, differing by 3 or more categories in the index results in elimination from the comp pool. Additionally, with the above-described example, any property that is designated as $CC_6$ may be deemed only comparable to other properties of the same designation.

(2) Property Quality: Similarly, if the quality category differs from the comp condition by a threshold number then the comp is eliminated from the comp pool. In one embodiment, differing by 2 or more categories in the index results in elimination from the comp pool. In another embodiment, differing by 3 or more categories in the index results in elimination from the comp pool. Additionally, with the above-described example, any property that is designated as $QC_6$ may be deemed only comparable to other properties of the same designation.

(3) Neighborhood: comps must be located in the Census Tract of the subject and its immediate neighboring tracts;

(4) Time: comps must be sales within twelve months of the effective date of appraisal or sale;

(5) GLA must be within a defined range, for example:

$$\frac{2}{3} \leq \frac{GLA_S}{GLA_C} \leq \frac{3}{2}$$

(6) Age similarity may be determined according to the following Table 1:

TABLE 1

| Subject Age | 0-2 | 3-5 | 6-10 | 11-20 | 21-40 | 41-65 | 65+ |
|---|---|---|---|---|---|---|---|
| Acceptable Comp Age | 0-5 | 0-10 | 2-20 | 5-40 | 11-65 | 15-80 | 45+ |

(6) Lot size similarity may be determined according to the following Table 2:

TABLE 2

| Subject Lot size | <2000 sqft | 2000-4000 sqft | 4000 sqft-3 acres | >3 acres |
|---|---|---|---|---|
| Acceptable Comp Lot | 1-4000 sqft | 1-8000 sqft | $\frac{2}{5} \leq \frac{LOT_S}{LOT_C} \leq \frac{5}{2}$ | >1 acre |

These exclusion rules are provided by way of example. There may be a set of exclusion rules that add variables, that omit one or more the described variables, or that use different thresholds or ranges.

(iii) Adjustment of Comps

Given the pool of comps to be analyzed by the model, the sale price of each comp may then be adjusted to reflect the difference between a given comp and the subject in each of the characteristics used in the regressions.

For example, individual adjustments are given by the following set of equations (2):

$$A_{gla}=\exp[(\ln(GLA_S)-\ln(GLA_C))\cdot \beta_{gla}];$$

$$A_{lot}=\exp[(\ln(LOT_S)-\ln(LOT_C))\cdot \beta_{lot}];$$

$$A_{age}=\exp[(\ln(AGE_S)-\ln(AGE_C))\cdot \beta_{age}];$$

$$A_{bath}=\exp[(BATH_S-BATH_C)\cdot \beta_{age}];$$

$$A_{loc}=\exp[LOC_S-LOC_C];$$

$$A_{time}=\exp[TIME_S-TIME_C];$$

$$A_{fcl}=\exp[FCL_S-FCL_C];$$

$$A_{qc}=\exp[QC_S-QC_C]; \text{ and}$$

$$A_{cc}=\exp[CC_S-CC_C], \quad \text{(Eq. 2)}$$

where coefficients βgla, βlot, βage, βbath, LOC, TIME, FCL, QC and CC are obtained from the hedonic price equation described above.

(iv) Weighting of Comps and Value Prediction

Because of unknown neighborhood boundaries and potentially missing data, the pool of comparables will likely include more than are necessary for the best value prediction in most markets. The adjustments described above can be quite large given the differences between the subject property and comparable properties. Accordingly, rank ordering and weighting are also useful for the purpose of value prediction.

The economic distance $D_{eco}$ between the subject property and a given comp may be described as a function of the differences between them as measured in dollar value for a variety of characteristics, according to the adjustment factors described above.

Specifically, the economic distance may be defined as a Euclidean norm of individual percent adjustments for all characteristics used in the hedonic equation:

$$D_{SC}^{eco} = \sqrt{\sum_{i\in\{gla,lot,age,bath,loc,time,fcl,qc,cc\}} (A_i - 1)} \quad \text{(Eq. 3)}$$

The comps are then weighted. Properties more similar to the subject in terms of physical characteristics, location, and time of sale are presumed better comparables and thus are preferably accorded more weight in the prediction of the subject property value. Accordingly, the weight of a comp may be defined as a function inversely proportional to the economic distance, geographic distance and the age of sale.

For example, comp weight may be defined as:

$$w_C = \frac{1}{D_{SC}^{eco} \cdot D_{SC}^{geo} \cdot dT_{SC}} \quad \text{(Eq. 4)}$$

where $D_{geo}$ is a measure of a geographic distance between the comp and the subject, defined as a piece-wise function:

$$D_{SC}^{eco} = \begin{cases} 0.1 & \text{if} \quad d_{SC} < 0.1 \text{ mi} \\ d_{SC} & \text{if} \quad 0.1 \text{ mi} \le d_{SC} \le 1.0 \text{ mi} \\ 1.0 + \sqrt{d_{SC} - 1.0} & \text{if} \quad d_{SC} > 1.0 \text{ mi}, \end{cases} \quad \text{(Eq. 5)}$$

and dT is a down-weighting age of comp sale factor $$dT_{SC} = \begin{cases} 1.00 & \text{if} \quad (0,90] \text{ days} \\ 1.25 & \text{if} \quad (90,180] \text{ days} \\ 2.00 & \text{if} \quad (180,270] \text{ days} \\ 2.50 & \text{if} \quad (270,365] \text{ days}. \end{cases} \quad \text{(Eq. 6)}$$

Comps with higher weight receive higher rank and consequently contribute more value to the final prediction, since the predicted value of the subject property based on comparable sales model is given by the weighted average of the adjusted price of all comps:

$$\hat{p}_S = \frac{\sum_{C=1}^{N_{COMPS}} w_C \cdot p_C^{adj}}{\sum_{C=1}^{N_{COMPS}} w_C} \quad \text{(Eq. 7)}$$

As can be seen from the above, the separate weighting following the determination of the adjustment factors allows added flexibility in prescribing what constitutes a good comparable property. Thus, for example, policy factors such as those for age of sale data or location may be separately instituted in the weighting process. Although one example is illustrated it should be understood that the artisan will be free to design the weighting and other factors as necessary.

(v) Property Condition Adjustments

The previously described adjustments are made for the various property characteristics. An adjustment is also made based upon the property condition index. Preferably, after obtaining an estimated sale price from comp sales model, the difference between the actual and predicted price is regressed on the predicted condition index to obtain a price for each of the condition categories. Then based on these coefficients, and the difference between the subject and comp condition, an adjustment is made to the predicted sale price of the subject.

As an alternative it is possible to regress log price on property characteristics and predicted condition indices in the hedonic regression. However, this may not be viewed as desirable because the residuals from the hedonic regression were used to predict the condition. In any event, this approach may be more defendable when are operating out of sample.

It should also be noted that an appraisal may be reviewed to determine the propriety of a property condition adjustment. There, the system may review the comparables that appraisers selected, and compare those with the model selected comparables pool. If, in some appraisals, an appraiser has made a big adjustment based on condition or picked rather expensive comps to justify the subject's price, the predicted condition index can be used to determine whether the selected comparable(s) were appropriate.

(vi) Listing and Mapping of Comparable Properties

The comparable properties may then be listed according to the weighting, or a ranking from the highest weighted comparable property to the lowest. This listing may be variously limited to accommodate listing them within a display area. For example, a default setting might be 20 comparable properties. The list of comparable properties includes, of course, the model-chosen comparable properties. They may also include appraiser-chosen comparables.

Mapping and analytical tools that implement the comparable model are provided. Mapping features allow the subject property and comparable properties to be concurrently displayed. Additionally, a table or grid of data for the subject properties is concurrently displayable so that the list of comparables can be manipulated, with the indicators on the map image updating accordingly.

A value history graph is also provided, which can be displayed separately or concurrently with the map and grid data. As introduced above, and as described in further detail below, the value history graph allows plots of the subject property, appraiser-chosen comparables and model-chosen comparables, in various configurations along a timeline with corresponding color-coding of properties and indications of transaction information. The graph information is keyed to the grid data and the population of the graph may be dictated accordingly.

With further reference to the figures, examples of environments and particular embodiments implementing an AVM and corresponding map, grid and graphical data follow.

Figure 1B:
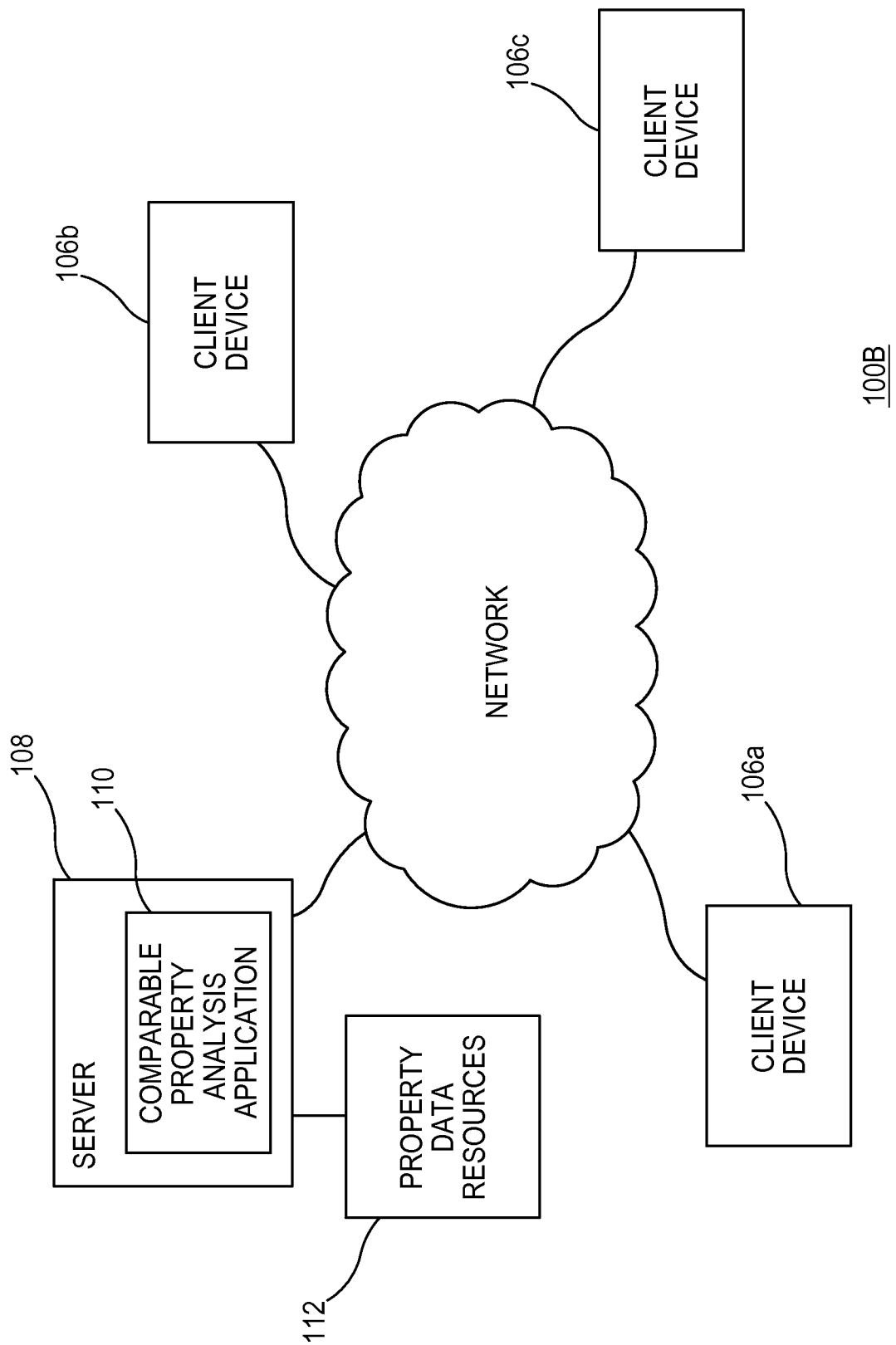

FIGS. 1A-B are block diagrams illustrating examples of systems 100A-B in which a comparable property analysis application operates.

FIG. 1A illustrates several user devices 102a-c each having a comparable property analysis application 104a-c.

The user devices 102a-d are preferably computer devices, which may be referred to as workstations, although they may be any conventional computing device. The network over which the devices 102a-d may communicate may also implement any conventional technology, including but not limited to cellular, WiFi, WLAN, LAN, or combinations thereof.

In one embodiment, the comparable property analysis application 104a-c is an application that is installed on the user device 102a-c. For example, the user device 102a-c may be configured with a web browser application, with the application configured to run in the context of the functionality of the browser application. This configuration may also implement a network architecture wherein the comparable property analysis applications 104a-c provide, share and rely upon the comparable property analysis application 104a-c functionality. The devices 102a-d are configured with a processor and a memory for storing program code for the application. The program code is executable by the processor to perform the automated valuation functionality described herein.

As an alternative, as illustrated in FIG. 1B, the computing devices 106a-c may respectively access a server 108, such as through conventional web browsing, with the server 108 providing the comparable property analysis application 110 for access by the client computing devices 106a-c. As another alternative, the functionality may be divided between the computing devices and server. Finally, of course, a single computing device may be independent configured to include the comparable property analysis application.

As illustrated in FIGS. 1A-B, property data resources 110 are typically accessed externally for use by the comparable property analysis application, since the amount of property data is voluminous, and since the application is configured to allow access to any county or local area in a very large geographical area (e.g., for an entire country such as the United States). Additionally, the property data resources 110 are shown as a singular block in the figure, but it should be understood that a variety of resources, including company-internal collected information (e.g., as collected by Fannie Mae), as well as external resources, whether resources where property data is typically found (e.g., MLS, tax, etc.), or resources compiled by an information services provider (e.g., Lexis).

The comparable property analysis application accesses and retrieves the property data from these resources in support of the modeling of comparable properties as well as the rendering of map images of subject properties and corresponding comparable properties, and the display of supportive data (e.g., in grid form) in association with the map images. The comparable property analysis application also generates value history information for properties, as well as graphical displays of the value history information. The application also provides interfaces for determining which properties and other information to include on the graph, and for manipulating the display of the graph according to date range and other factors. Still further, selection of appropriate geographical areas, adjustments and exclusions, and importing of appraisals for review are provided.

Figure 2:
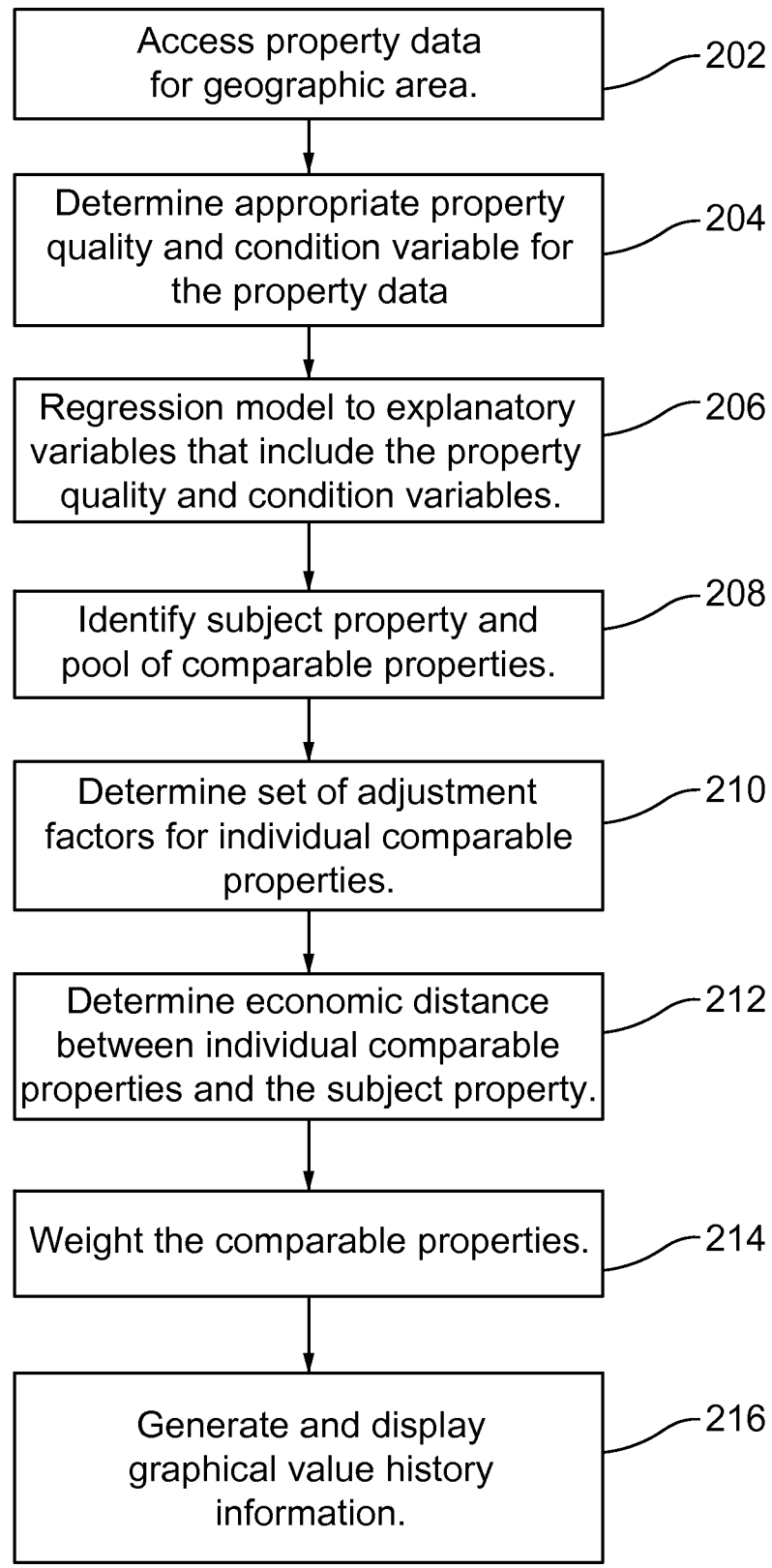
FIG. 2 is a flow diagram illustrating an example of a process for modeling comparable properties and generating value history information.

FIG. 2 is a flow diagram illustrating an example of a process 200 for modeling comparable properties and generating value history information.

As has been described, the application accesses 202 property data. This is preferably tailored at a geographical area of interest in which a subject property is located (e.g., county).

The appropriate property quality and condition variables are determined 204 for the property data. As described previously, the property data may be constituted from a variety of data sources, which may include property data databases as well as supplemental information such as may be accumulated from appraisal reports, real estate transactions, tax records, etc. The regression will implement a number of specific property characteristic variables, including the quality and condition variables. Preferably, techniques are implemented to reconcile any ambiguities or inconsistencies among the property data for the property characteristic variables. The reconciliation factors may include, for example, (1) identification of trusted sources or building of hierarchical source prioritization, (2) data elimination and averaging techniques (3) examination of data recency; and/or (4) separate regression on factors that are determined to evidence quality or condition.

A regression 206 modeling the relationship between price and explanatory variables is then performed on the accessed data. A subject property within the geographic area of interest is identified 208 as is a pool of comparable properties. As described, the subject property may be initially identified, which dictates the selection and access to the appropriate (e.g., county level) data. Alternatively, a user may be reviewing several subject properties within a county, in which case the county data will have been accessed, and new selections of subject properties prompt new determinations of the pool of comparable properties for each particular subject property.

The pool of comparable properties may be initially defined or refined using exclusion rules. This limits the unwieldy number of comparables that would likely be present if the entire county level data were included in the modeling of the comparables.

A set of adjustment factors is determined 210 for each comparable property in the pool. The adjustment factors may be a numerical representation of the price contribution of each of the explanatory variables, as determined from the difference between the subject property and the comparable property for a given explanatory variable. An example of the equations for determining these individual adjustments has been provided above.

Once these adjustment factors have been determined 210, the economic distance between the subject property and respective individual comparable properties may also be determined 212. The economic distance is preferably constituted as a quantified value representative of the estimated price difference between the two properties as determined from the set of adjustment factors for each of the explanatory variables, including property quality and condition.

Following determining of the economic distance, the comparable properties are weighted 214 in support of generating a ranking of the comparable properties according to the model. A preferred weighting, described previously, entails a function inversely proportional to the economic distance, geographic distance and age of transaction (typically sale) of the comparable property from the subject property.

The weights may further be used to calculate an estimated price of the subject property comprising a weighted average of the adjusted price of all of the comparable properties.

Once the model has performed the regression, adjustments and weighting of comparables, a variety of displays may be generated using the data. Preferably, the application generates and displays graphical value history information (216). These value history graphs may depict one or more of (1) the subject property; (2) corresponding appraiser-chosen comparable properties; (3) model-chosen comparable properties; and/or (4) local home price index.

Accordingly, the application receives input for defining the content to be provided in and then generates a corresponding value history graph. The received input may be provided through separate interfaces, or may be provided through information displayed in the grid data. Thus, the subject property and corresponding comparable properties may be selected from the grid data for inclusion in the value history graph, with the graph being generated accordingly. Once the graph is displayed, it may be updated to expand or contract the illustrated date range, or to include or exclude data in and from the graph.

Figure 3:
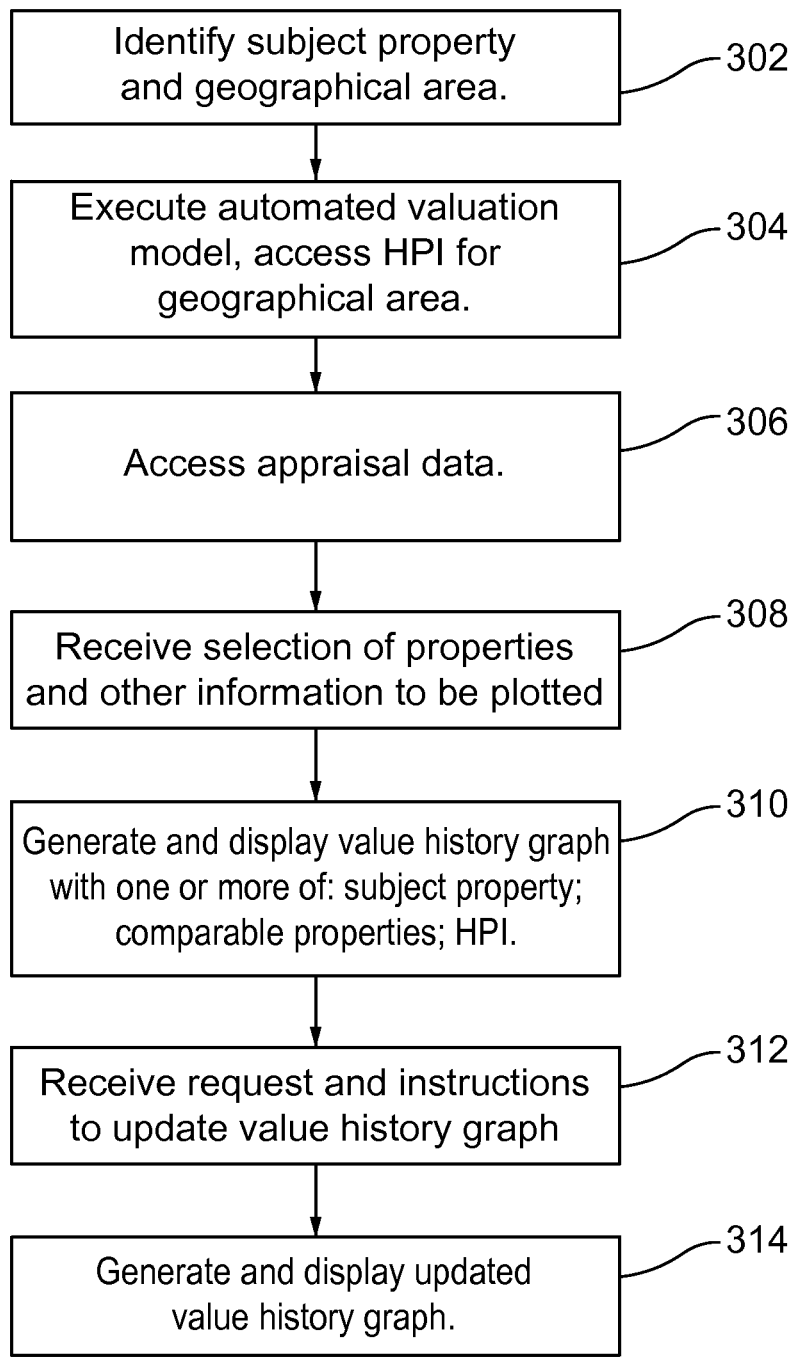
FIG. 3 is a flow diagram illustrating an example of a process 300 for generating a graphical value history display.

FIG. 3 is a flow diagram illustrating an example of a process 300 for generating a graphical value history display. The subject property is identified 302, such as by entry of address or other identification, or though selection from a map image. A default or specified geographic area corresponds to the subject property (e.g., zip code or MSA) and that may be used to dictate further valuation processes.

An AVM is run 304 based upon the subject property, geographical area, and corresponding property data in order to generate information about a pool of comparable properties. Exclusions and adjustments may also be calculated and applied as described previously. This results in a usable pool of comparable properties that may be weighted, ranked and displayed accordingly, whether on the map image or in grid data. Additionally, in connection with the subject property, a database of appraisal data is accessed 306. This, for example, allows an appraisal report corresponding to the subject property to be evaluated. The appraisal report will typically include 3 or more appraiser-chosen comparable properties deemed to be the best comparables to the subject property by an independent appraiser. The appraiser-chosen comparables may be similarly displayed in the map image and/or grid data.

Prior to generating a value history graph, selection is received 308 in order to populate the graph. Selection may include the subject property, model-chosen comparables, appraiser-chosen comparables, baseline data such as an HPI for the geographical area of the subject property, and other data. Additionally, a selection may be made with regard to the time range to be depicted, or a default range (e.g., 5 years) may be used.

A graph including the selected information is then generated 310. The property data contains the information useful for generating the graph. Specifically, the property data may include transaction information for each property to be depicted in the graph, including prior sales data, prior refinancing data, REO data, etc. These transactions are examples of data points that may be depicted in the graph for a given property. The HPI may also be generated with iterative calculation of data points throughout the denoted time range. Thus, a continuous plot may be made for the HPI and the various subject and comparable properties to be depicted in the graph.

The graph may be updated 312 in various ways, including the inclusion of properties not previously graphed, the removal of properties from an existing rendering of a graph, the additional or removal of baseline data such as the local HPI, the expansion or contraction of the time range to be depicted, and so on. Once input is received with regard to an update, and appropriate input may be made by the user to re-generate 314 the value history graph according to the updated request.

Figure 4:
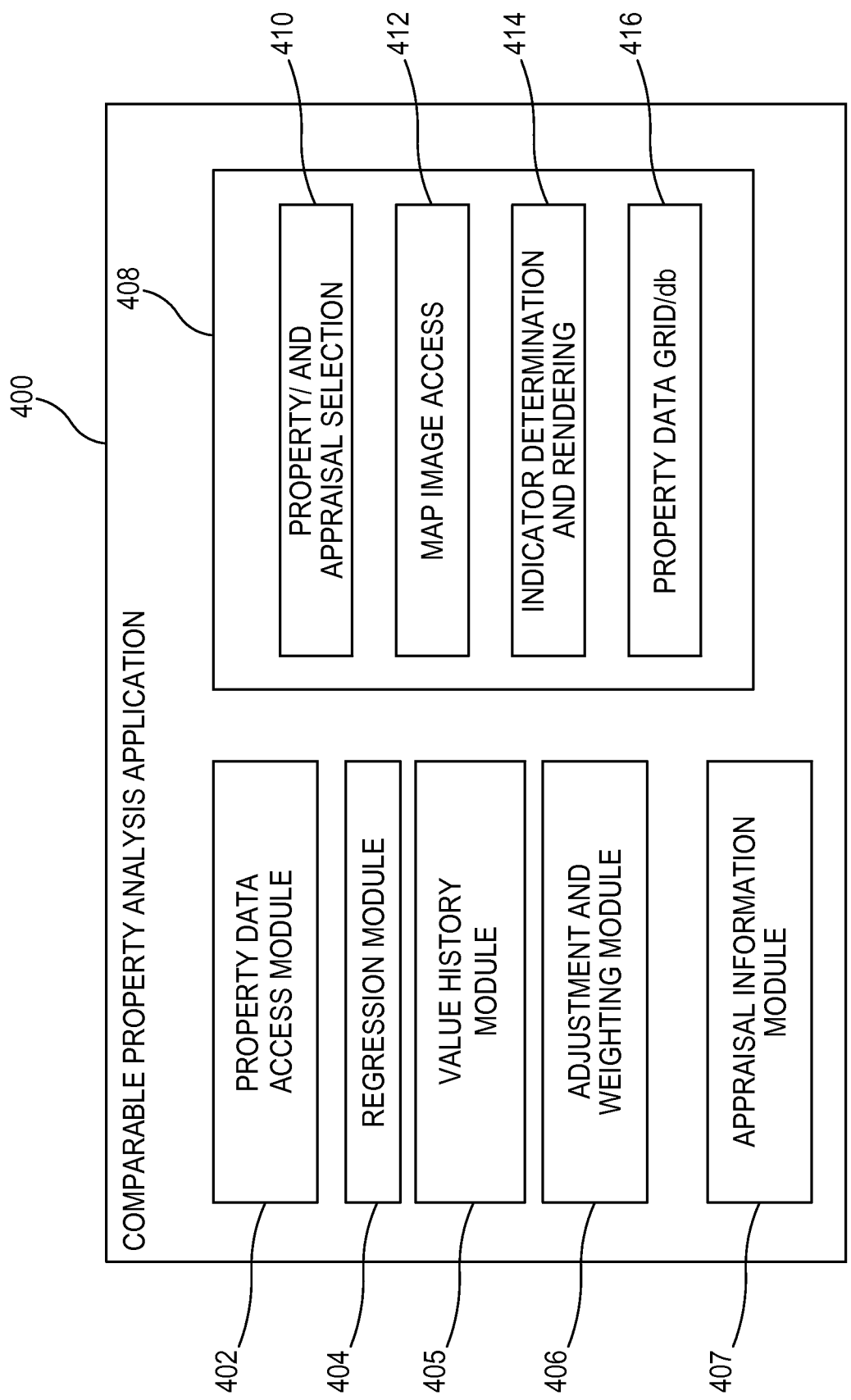
FIG. 4 is a block diagram illustrating an example of a comparable property analysis application incorporating an automated appraisal model for assessing comparable properties, with corresponding value history graph generation.

FIG. 4 is a block diagram illustrating an example of a comparable property analysis application 400 incorporating an automated appraisal model for assessing comparable properties, with corresponding value history graph generation.

The application 400 preferably comprises program code that is stored on a non-transitory computer readable medium (e.g., compact disk, hard disk, etc.) and that is executable by a processor to perform the operations to automatically model comparable properties.

According to one aspect, the application 400 includes program code executable to perform operations of accessing property data corresponding to a geographical area, performing the regression, identifying comparable properties, performing value adjustments, weighting the comparable properties, and rendering map image, grid and graphical data as described above.

The application 400 includes program code executable to perform operations of accessing property data corresponding to a geographical area, and performing a regression based upon the property data, the regression modeling the relationship between a dependent variable and property-characteristic explanatory variables.

The application 400 also includes program code for displaying a map image corresponding to the geographical area, and displaying indicators on the map image indicative of the subject property and at least one of the plurality of comparable properties, as well as ranking the plurality of comparable properties based upon the weighting, and displaying a text listing of the plurality of comparable properties according to the ranking.

The application 400 also includes program code for receiving identification of properties and other data for display on a value history graph, and for generating and updating the graph accordingly.

The comparable property analysis application 400 is preferably provided as software, but may alternatively be provided as hardware or firmware, or any combination of software, hardware and/or firmware. The application 400 is configured to provide the comparable property modeling, appraisal results comparing and corresponding mapping and graphing functionality described herein. Although one modular breakdown of the application 400 is offered, it should be understood that the same functionality may be provided using fewer, greater or differently named modules.

The example of the comparable property analysis application 400 of FIG. 4 includes a property data access module 402, regression module 404, a value history module 405, an adjustment and weighting module 406, appraisal information module 407, and UI module 408, with the UI module 408 further including a property and appraisal selection module 410, map image access module 412, indicator determining and rendering module 414 and property data grid/DB module 416.

The property data access module 402 includes program code for carrying access and management of the property data, whether from internal or external resources. The regression module 404 includes program code for carrying out the regression upon the accessed property data, according to the regression algorithm described above, and produces corresponding results such as the determination of regression coefficients and other data at the country (or other) level as appropriate for a subject property. In particular, the regression module 404 implements both a regression involving property characteristics that include the quality and condition categorical variables.

The adjustment and weighting module 406 is configured to apply the exclusion rules, and to calculate the set of adjustment factors for the individual comparables, the economic distance, and the weighting of the comparables.

The appraisal information module 407 may be a standalone database or may organize access to a variety of external databases of appraisal information. The appraisal information is typically in the form of appraisal reports for subject properties, wherein a set of comparable properties chosen by an appraiser is listed. The appraisal information may be retrieved based upon a variety of criteria, including search by subject property, identification number, or characteristics (appraiser ID, vendor, date, etc.).

The UI module 408 manages the display and receipt of information to provide the described functionality. It includes a property and appraisal selection module 410, to manage the interfaces and input used to identify one or more subject properties and corresponding appraisal information. The map image access module 412 accesses mapping functions and manages the depiction of the map images as well as the indicators of the subject property and the comparable properties. The indicator determination and rendering module 414 is configured to manage which indicators should be indicated on the map image depending upon the current map image, the weighted ranking of the comparables and predetermined settings or user input. The property data grid/DB 416 manages the data set corresponding to a current session, including the subject property and pool of comparable properties. It is configured as a database that allows the property data for the properties to be displayed in a tabular or grid format, with various sorting according to the property characteristics, economic distance, geographical distance, time, etc.

The value history module 405 is configured to graphically display value history information in association with a subject property. In one example, it generates a graph plotting the valuation history of a subject property over an adjustable time range in relation to a general price index for a pertinent geographical area.

The value history module 405 also communicates with the property/appraisal selection module 410 to accommodate access to appraisal data and corresponding selective plotting of appraiser-selected comparable properties' valuation histories against that of the subject property.

The value history module 405 also provides further interfaces for updating the valuation history for comparable properties with scaling on a pro-rata basis according to the percentage of the adjustments made within the appraisal. In addition, the graph selectively incorporates model-generated comparables and their valuation histories.

In one embodiment, a dynamic chart is used to plot the valuation history of a subject property. Grid data is also accessible both for selection of properties and for updating the property data to be displayed in the graph. Preferably, transaction information such as a refinance, sale, or REO transaction is used to plot the valuation history. Additionally, a historical HPI for the subject property's geographic region (e.g., Postal Code or MSA) may also plotted according to user selection and preference.

In this fashion, the subject property, an HPI for the geographical area, model-chosen comparables, appraiser-chosen comparables and other information may be displayed on a value history graph.

A user interface is provided to receive information to tailor the graph, such as identification of the subject property, identification of an appraisal report and/or its appraiser-chosen comparables, date range preferences, and other information. The time window for the plotting mechanism can be expanded and contracted according to the preference of the user. A grid may also be concurrently displayed with the graph, and is configured to as a key to the graph. For example, the grid may be configured to display the name of each historical valuation, an actual price for all properties, and an adjusted price for all model and appraiser selected comparables. Color coding and a variety of symbols may be used to identify valuation histories and corresponding valuation transactions.

FIGS. 5A-D are display diagrams 500*a-d* illustrating examples of displays generated by the comparable property analysis application.

Figure 5A:
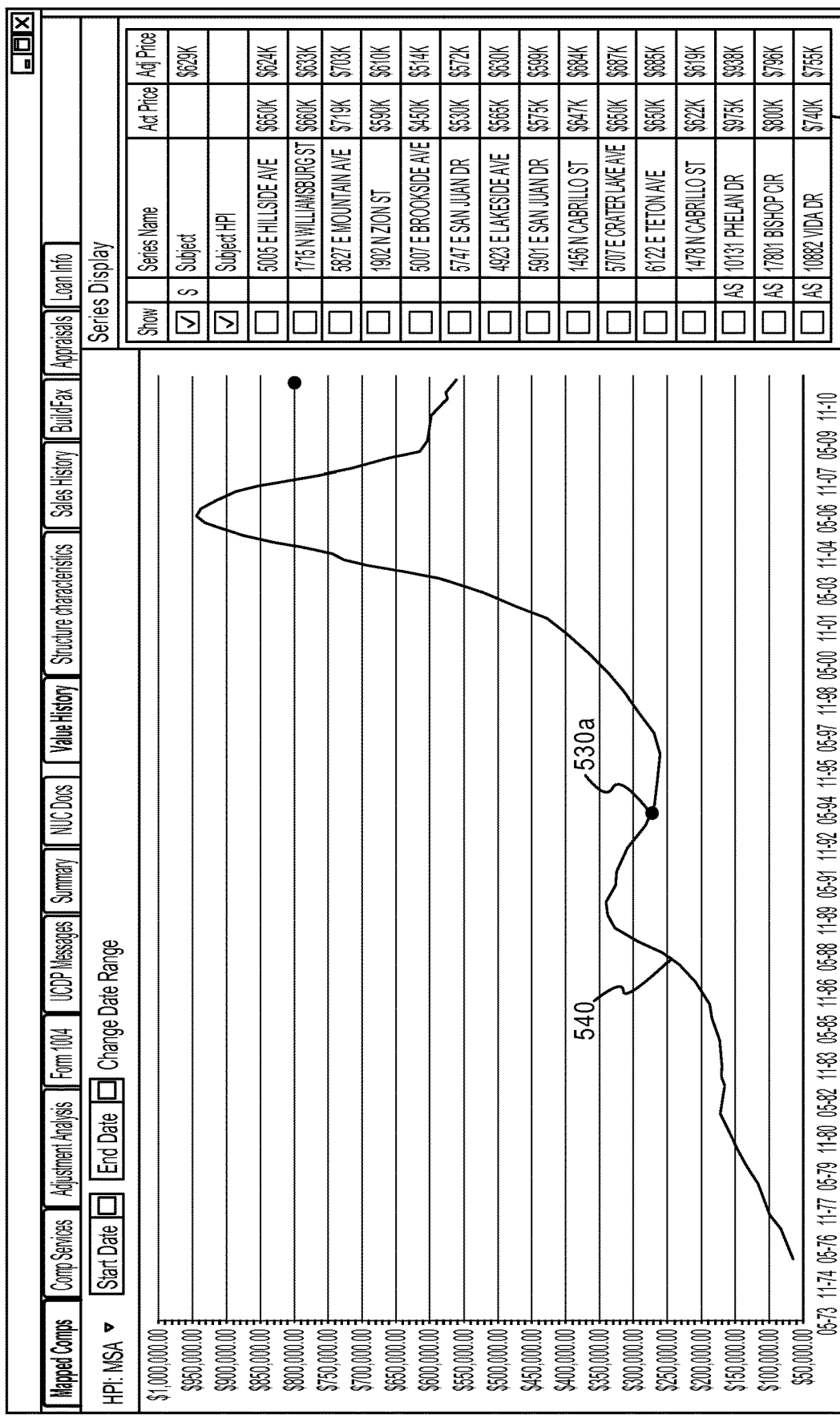
Figure 5C:
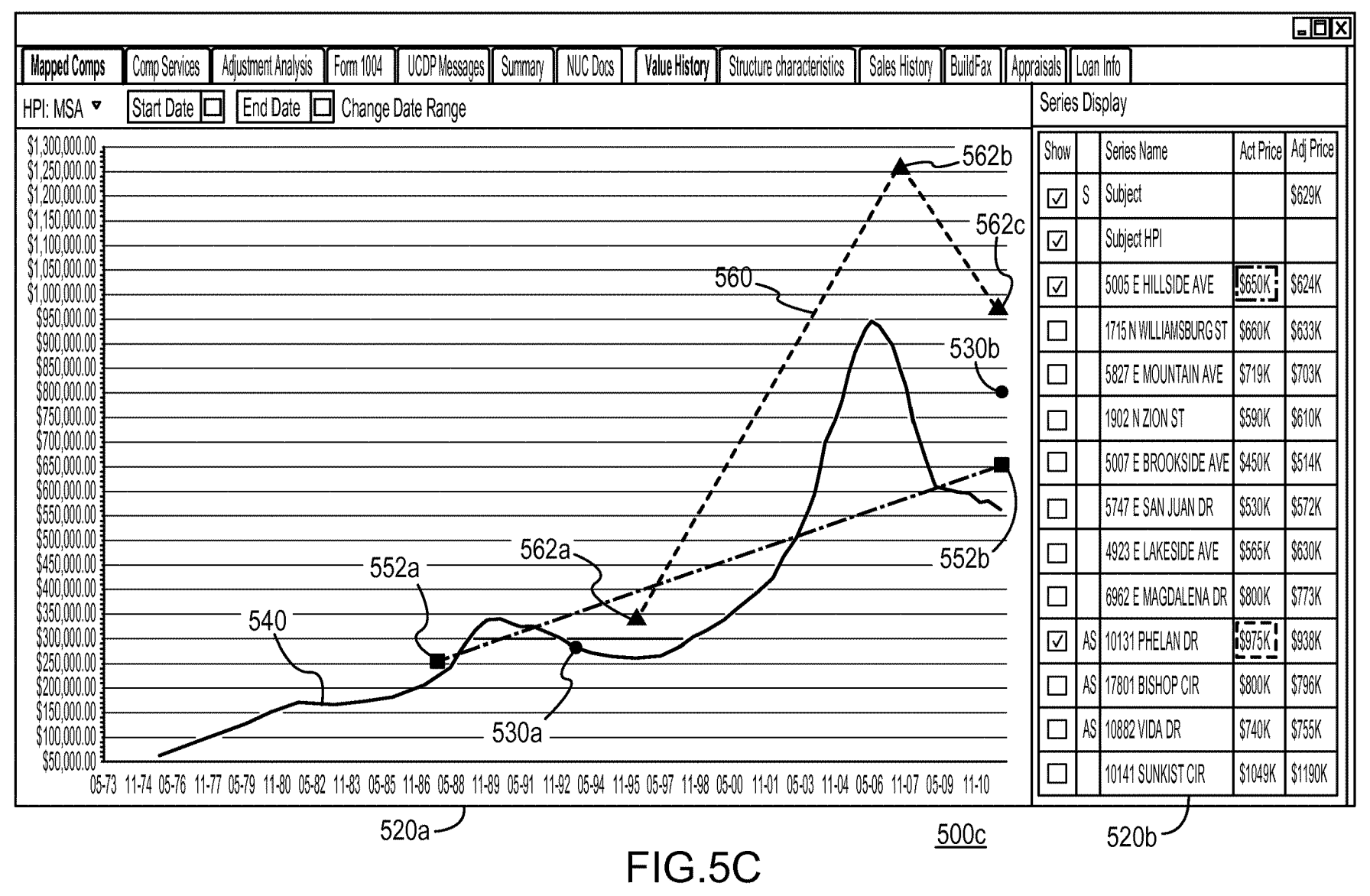
Figure 5D:
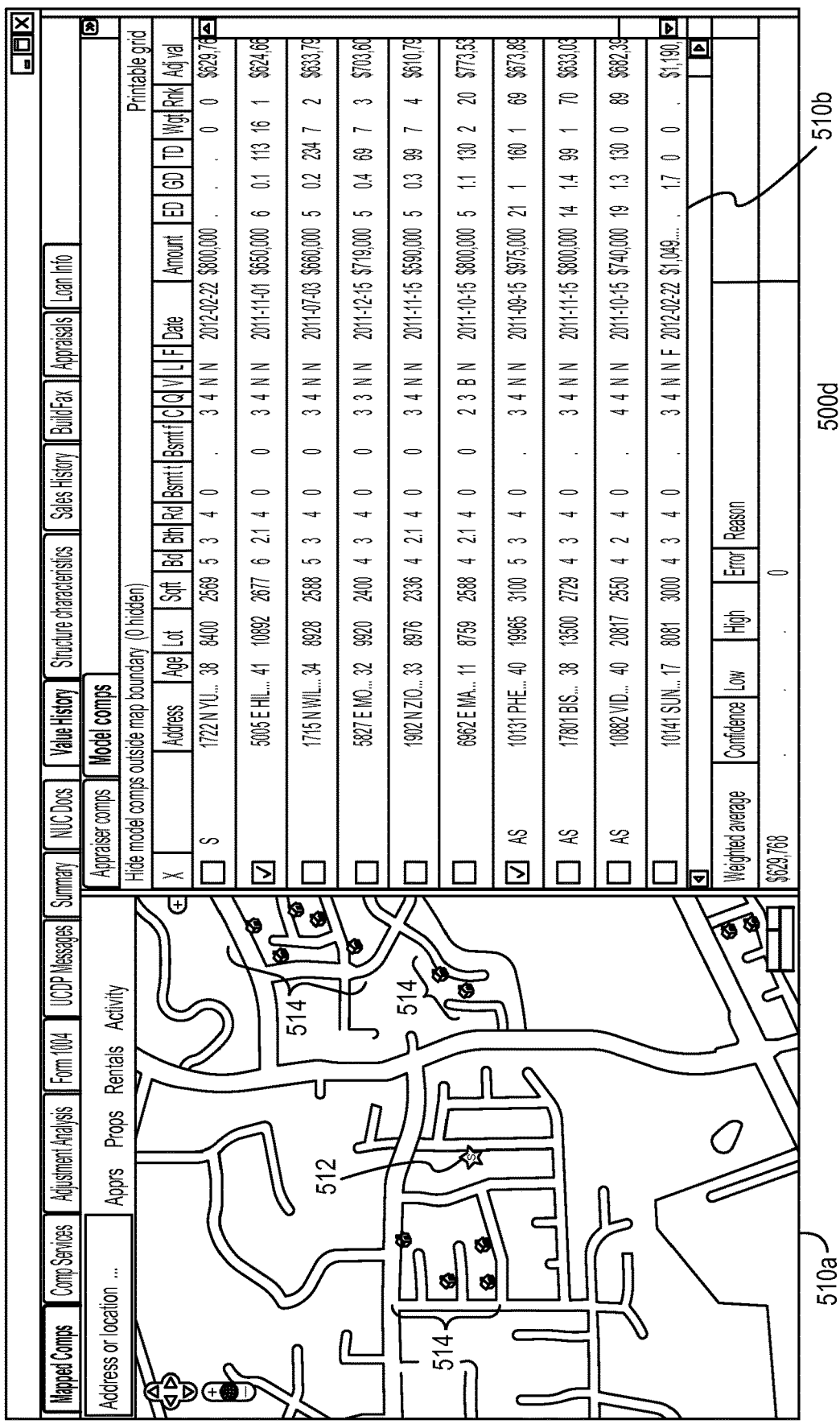

FIG. 5D is a display diagram 500*d* illustrating an example of a map image 510*a* and property grid data 510*b* updated to indicate appraiser-chosen comparable properties among a ranked listing of model-chosen comparable properties.

The map image 510*a* depicts a region that can be manipulated to show a larger or smaller area, or moved to shift the center of the map image, in convention fashion. This allows the user to review the location of the subject property 512 and corresponding comps 514 at any desired level of granularity. This map image 510*a* may be separately viewed on a full screen, or may be illustrated alongside the property data grid 510*b* as shown.

The property grid data 510*b* contains a listing of details about the subject property and the comparable properties, as well as various information fields. A left hand column includes check boxes usable to indicate the subject and/or properties of interest. To the right of that column is a column that provides an identifier for the listed property. Specifically, "S" indicates the subject property, "AS" indicates an appraiser-chosen comparable property (that is also ranked by the model) and a blank space indicates a property ranked by the model ("model-chosen" comparable property) but not by the appraiser. Other fields in the property data grid 510*b* include the address of the property ("Address"), the square footage ("Sq Ft"), the lot size ("Lot"), the age of the property ("Age"), the number of bathrooms ("Bath"), the age of the prior sale ("Sale Age"), the prior sale amount ("Amount"), the foreclosure status ("FCL", or "F" (y/n)), the economic distance ("ED"), geographic distance ("GD") and time distance ("TD", e.g., as measured in days) factors as described above, the weight ("Wgt"), the ranking by weight ("Rnk"), and the valuation as determined from the comparable sales model ("Adj. Val").

Initially, a user may navigate through an appraisal selection screen that allows the user to identify and select an appraisal report for a subject property. Once this report is selected, the map image 510*a* and property grid data 510*b* may be prompted accordingly, such that the subject property and the appraiser-chosen comparable properties are listed and displayed.

For example, FIG. 5D illustrates an example of a display screen 500*d* that concurrently displays a map image 510*a* and a corresponding property data grid 510*b* once an appraisal report for a subject property has been selected. As indicated in the property grid data, the listing identified as "S" is the subject property, and the listings identified as "AS" indicate appraiser-chosen comparable properties. The subject property 512 and comparable properties 514 are indicated in the map image as well.

The map image 510*a* and grid data 510*b* allow concurrent review of the location of the subject and comparables, as well as where the appraiser-chosen comparables fall within the ranking determined by the model. As the figure illustrates, the appraiser-chosen comparables "AS" respectively rank 69, 70 and 89 among the ranking determined by the model.

Further assessment of the data can be variously undertaken by the user. The map image 510*a* also allows the user to place a cursor over any of the illustrated properties to prompt highlighting of information for that property and other information. Additionally, the listing of comparables in the property grid data 510*b* can be updated according to any of the listed columns. The grid data can be variously sorted to allow the user to review how the subject property compares to the listed comparable properties.

The user may variously update the map image and manipulate the property data grid in order to review and assess and subject property and the corresponding comparable properties in a fashion that is both flexible and comprehensive.

Among the data generated by the comparable property analysis application preferably is value history information corresponding to an appraisal review, such as illustrated in FIGS. 5A-C.

For example, FIG. 5A illustrates a display diagram 500*a* depicting a value history area 520*a* and summary grid data 520*b* corresponding to a subject property, corresponding appraisal, and corresponding model ranking. The summary grid data 520*b* lists properties and corresponding information including the identifier (S, AS, etc.), name/address, actual price, and adjusted price (the model-determined present value including adjustments).

In the value history mode, the value history area 520*a* is configured to update according to the items selected in the summary grid data 520*b*. For example, the subject property is checked in the summary grid data 520*b*. Because of this, information corresponding to the subject property is provided in the value history area 520*a*. The value history area 520*a* is preferably provided as a graphical image that can be updated to reflect a desired time frame. It can also be scaled as desired, with a linear scale being depicted in the offered example. For the subject property, the value history area 520*a* depicts two subject property data points 530*a* and 530*b*. Here, the first data point 530*a* is a past transaction involving the subject property. The second data point 530*b* is the appraisal value that the appraiser determined for the subject property in the appraisal report under review. As is evident, the value determined by the appraiser is $800,000. By contrast, the summary grid data 520*b* shows that the model determined an adjusted price of $629,000.

In this fashion, the graphical information can be compared to the grid data to show where the appraised value falls in comparison to the information generated by the model. One piece of selectable information that can be represented along with the subject property data points 530*a* and 530*b* is an HPI (home price index) keyed to the previous transaction (530*a*) of the subject property. When the "Subject HPI" entry is checked in the summary grid data 520*b*, the value history area 520*a* updates to show the corresponding plot 540 of the Subject HPI. The HPI is an index for a geographical area corresponding to the subject property. By taking the past transaction (530*a*) information and the HPI, one can generate and render the curve corresponding to the historical valuation of the property according to the index. Here, the user can see the peaks and valleys of the value over time. Additionally, discrepancies between the appraised value and that determined according to the HPI are shown. Here, the Subject HPI curve 540 suggests that as of the appraisal date, the valuation is presumably about $550,000, a significant departure from the appraised value of $800,000.

FIG. 5B illustrates a display diagram 500*b* wherein a model-chosen comparable is also selected in the summary grid data 520*b* area. The value history area 520*a* is updated to also show a plot 550 corresponding to the selected model-chosen comparable property, along with the subject property and subject HPI information. The subject property and subject HPI information remain illustrated in the value history area 520*a* because they remain selected in the summary grid data 520*b* area. However, those and other entries in the summary grid data 520*b* may be variously selected and deselected to populate the value history area 520 according to whatever information is desired by the user.

As evident in the figure, the selected model-chosen comparable has data points 552*a* and 552*b*, illustrated as square dots in the plot 550 for the property. It is noted that points 552*a* and 552*b* correspond to transaction data. In other words, a prior transaction was for ~250K (552*a*) and a recent transaction is for 650K (552*b*). The 650K corresponds to "Actual Price" in the grid. The model adjusted price is a little lower (624K).

FIG. 5C illustrates a display diagram 500*c* wherein an appraiser-chosen comparable is also selected in the summary grid data 520*b* area. The value history area 520*a* is again updated to illustrate a plot 560 corresponding to the selected appraiser-chosen comparable, along with the other information previously indicated in FIG. 5B. Data points 562*a*-*c* are depicted for the appraiser chosen comparable. The first two points depict prior transaction data, whereas the third point 562*c* depicts the appraised value.

Here, the various plots/curves 540, 550, 560 and data points allow a thorough yet immediately illustrative assessment of whether the appraiser-chosen comparable is a proper selection for the subject property, along with a corresponding showing of how the appraiser-chosen comparable compares the subject property, HPI data, and other comparables including model-chosen comparables that were not selected by the appraiser. In the described and illustrated fashion, the comparable property analysis application thus allows a grid and graph based comparison and assessment of the propriety of an appraisal report, or for review of any group of properties related to a subject.

Thus embodiments of the present invention produce and provide indexing and adjusting for property condition in an automated valuation model. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for generating a graphical user interface for displaying value history information based at least in part on a subject property, the method comprising:
  receiving, by a computing system, a request to assess an appraisal value in an appraisal report of the subject property;
  determining, by the computing system, a comparable property for comparison to the subject property;
  accessing, by the computing system, a home price index for a geographical area in which the subject property is located, wherein the home price index is a collection of numerical measures, each numerical measure of the collection of numerical measures corresponding to a different time interval, of aggregate home price within the geographical area;
  generating, by the computing system, the graphical user interface for displaying the value history information based at least in part on the subject property, the graphical user interface including a value history display area being in a form of a graph with a time axis and a valuation axis, the value history display area including
    a first set of value history information for the subject property, the first set of value history information including the appraisal value of the subject property and at least one prior realized transactional valuation of the subject property,
    a second set of value history information for comparison to the subject property by extrapolating a subject home price index curve from a most recent instance of said at least one prior realized transactional valuation of the subject property and the home price index, and
    a third set of value history information for the comparable property, the third set of value history information including at least two prior realized transactional valuations of the comparable property;
  displaying, by the computing system, the graphical user interface; and
  determining, by the computing system, at least one additional comparable property for comparison to the subject property,
  wherein the value history display area further includes a fourth set of value history information for the at least one additional comparable property, the fourth set of value history information including at least two prior realized transactional valuations of the at least one additional comparable property and including an appraised value of the at least one additional comparable property, and
  wherein at least one of the comparable property and said at least one additional comparable property is an appraiser-chosen comparable property determined by the computing system by receiving user input that identifies the comparable property, and at least one of the comparable property and said at least one additional comparable property is a model-chosen comparable property determined by the computing system by utilizing an automated valuation module, such that the value history display area of the graphical user interface depicts a cross comparison of the value histories for the subject property, the appraiser-chosen comparable property and the model-chosen comparable property.

2. The method of claim 1,
  wherein the comparable property is determined by the computing system by accessing property data and utilizing the automated valuation module.

3. The method of claim 1,
  wherein the comparable property is determined by the computing system by receiving user input that identifies the comparable property.

4. The method of claim 1, further comprising:
  generating, by the computing system, a present adjusted valuation of the subject property based on the automated valuation module.

5. The method of claim 1, further comprising:
  generating, by the computing system, a present adjusted valuation of the comparable property;
  adjusting, by the computing system, the third set of value history information according to a percent difference between the present adjusted valuation of the comparable property and a most recent instance of the at least two prior realized transactional valuations of the comparable property.

6. The method of claim 1, wherein the graphical user interface further includes a summary grid data display area, the summary grid data display area including entries for the subject property, the comparable property, and the at least one additional comparable property, with property characteristics being displayable for the respective entries, the method further comprising:
  receiving, by the computing system, selection among the entries for inclusion in the summary grid data display area of the graphical user interface, such that the value history display area of the graphical user interface includes or excludes value history information associated with the selected entry according to the received selection.

7. A non-transitory computer readable medium storing program code for generating a graphical user interface for displaying value history information based at least in part on a subject property, the program code being executable by a processor of a computing system for performing operations comprising:
  receiving a request to assess an appraisal value in an appraisal report of the subject property;
  determining a comparable property for comparison to the subject property;
  accessing a home price index for a geographical area in which the subject property is located, wherein the home price index is a collection of numerical measures, each numerical measure of the collection of numerical measures corresponding to a different time interval, of aggregate home price within the geographical area;

generating the graphical user interface for display the value history information based at least in part on the subject property, the graphical user interface including a value history display area being in a form of a graph with a time axis and a valuation axis, the value history display area including
- a first set of value history information for the subject property, the first set of value history information including the appraisal value of the subject property and at least one prior realized transactional valuation of the subject property,
- a second set of value history information for comparison to the subject property by extrapolating a subject home price index curve from a most recent instance of said at least one prior realized transactional valuation of the subject property and the home price index, and
- a third set of value history information for the comparable property, the third set of value history information including at least two prior realized transactional valuations of the comparable property;

controlling a display device to display the graphical user interface; and determining at least one additional comparable property for comparison to the subject property, wherein the value history display area further includes a fourth set of value history information for the at least one additional comparable property, the fourth set of value history information including at least two prior realized transactional valuations of the at least one additional comparable property and including an appraised value of the at least one additional comparable property, and wherein at least one of the comparable property and said at least one additional comparable property is an appraiser-chosen comparable property determined by the computing system by receiving user input that identifies the comparable property, and at least one of the comparable property and said at least one additional comparable property is a model-chosen comparable property determined by the computing system by utilizing an automated valuation module, such that the value history display area of the graphical user interface depicts a cross comparison of the value histories for the subject property, the appraiser-chosen comparable property and the model-chosen comparable property.

8. The non-transitory computer readable medium of claim 7,
wherein the comparable property is determined by the computing system by accessing property data and the automated valuation module.

9. The non-transitory computer readable medium of claim 7,
wherein the comparable property is determined by the computing system by receiving user input that identifies the comparable property.

10. The non-transitory computer readable medium of claim 7, the operations further comprise:
generating a present adjusted valuation of the subject property based on the automated valuation module.

11. The non-transitory computer readable medium of claim 7, wherein the operations further comprise:
generating a present adjusted valuation of the comparable property;
adjusting the third set of value history information according to an percent difference between the present adjusted valuation of the comparable property and a most recent instance of the at least two prior realized transactional valuations of the comparable property.

12. The non-transitory computer readable medium of claim 7, wherein the graphical user interface further includes a summary grid data display area, the summary grid data display area including entries for the subject property, the comparable property, and the at least one additional comparable property, with property characteristics being displayable for the respective entries, the operations further comprise:
receiving selection among the entries for inclusion in the summary grid data display area, such that the value history display area of the graphical user interface includes or excludes value history information associated with the selected entry according to the received selection.

13. An electronic apparatus, comprising:
a processor;
a display device;
an input device; and
a memory having program code stored thereon for generating a graphical user interface for display value history information based at least in part on a subject property, the program code being executable by the processor for performing operations comprising:
receiving a request to assess an appraisal value in an appraisal report of the subject property from the input device;
determining a comparable property for comparison to the subject property;
accessing a home price index for a geographical area in which the subject property is located, wherein the home price index is a collection of numerical measures, each numerical measure of the collection of numerical measures corresponding to a different time interval, of aggregate home price within the geographical area;
generating the graphical user interface for displaying the value history information based at least in part on the subject property, the graphical user interface including a value history display area being in a form of a graph with a time axis and a valuation axis, the value history display area including
- a first set of value history information for the subject property, the first set of value history information including the appraisal value of the subject property and at least one prior realized transactional valuation of the subject property,
- a second set of value history information for comparison to the subject property by extrapolating a subject home price index curve from a most recent instance of said at least one prior realized transactional valuation of the subject property and the home price index, and
- a third set of value history information for the comparable property, the third set of value history information including at least two prior realized transactional valuations of the comparable property;

controlling the display device to display the graphical user interface; and determining at least one additional comparable property for comparison to the subject property, wherein the value history display area further includes a fourth set of value history information for the at least one additional comparable property, the fourth set of value history information including at least two prior realized transactional valuations of the at least one additional comparable property and including an appraised value of the at least one additional comparable property, and wherein at least one of the comparable property and said at least one additional comparable property is an appraiser-chosen comparable property by receiving user input that identifies the comparable property, and at least one of the comparable property and said at least one additional comparable property is a model-chosen comparable property by utilizing an automated valuation module, such that the value history display area of the graphical user interface depicts a cross comparison of the value histories for the subject property, the appraiser-chosen comparable property and the model-chosen comparable property.

14. The electronic apparatus of claim 13, wherein the comparable property is determined by the processor by receiving user input that identifies the comparable property.

15. The electronic apparatus of claim 13, wherein the operations further include generating a present adjusted valuation of the subject property based on the automated valuation module.

16. The electronic apparatus of claim 13, wherein the operations further include generating a present adjusted valuation of the comparable property; and adjusting the third set of value history information according to a percent difference between the present adjusted valuation of the comparable property and a most recent instance of the at least two prior realized transactional valuations of the comparable property.

\* \* \* \* \*